March 6, 1956 J. H. HAINES 2,737,628

MIXED HIGHS FILTER CIRCUIT

Filed July 27, 1951 3 Sheets-Sheet 1

INVENTOR.
JESSE H. HAINES
BY Darby & Darby
ATTORNEYS

MIXED HIGHS FILTER CIRCUIT

Filed July 27, 1951 3 Sheets-Sheet 2

INVENTOR.
JESSE H. HAINES
BY Darby & Darby
ATTORNEYS

March 6, 1956 J. H. HAINES 2,737,628

MIXED HIGHS FILTER CIRCUIT

Filed July 27, 1951 3 Sheets-Sheet 3

INVENTOR.
JESSE H. HAINES

BY Darby & Darby

ATTORNEYS

United States Patent Office 2,737,628

Patented Mar. 6, 1956

2,737,628

MIXED HIGHS FILTER CIRCUIT

Jesse H. Haines, Philadelphia, Pa., assignor to Allen B. Du Mont Laboratories, Inc., Clifton, N. J., a corporation of Delaware Application July 27, 1951, Serial No. 238,891

2 Claims. (Cl. 333—6)

This invention relates to electrical filters and particularly to filters for use in color television.

In a number of the so-called simultaneous or quasi-simultaneous color television systems (as defined in Electronics, September 1950) it has been proposed to separate the electrical signal representing one or more of the primary color components into bands according to frequency characteristics. The primary reason for making this separation is to reduce the total band width used to transmit the color television signal and it is necessary, therefore, that guard bands between adjacent signal transmitting bands be made as narrow as possible.

In order to effect a greater saving in the frequency spectrum it has been proposed to use a so-called "mixed-highs" system of transmission in which the high frequency components of the signals representing the three primary colors are mixed together while the low frequency components are transmitted separately, either sequentially or simultaneously. In order to separate the high frequency portions of the signals from the low frequency portions, and then to recombine these portions in the receiver without creating undesirable effects, either due to omission of a certain band of frequencies adjacent to the cross-over frequency or to the double inclusion of a band of frequencies adjacent to cross-over in both the high and low frequency circuits, it is necessary that the separating filters have complementary frequency response characteristics at or about the cross-over frequency. The design and construction of separate filters to pass the high and low frequency portions of the signal and to have the necessary complementary frequency response is difficult.

One object of this invention is to provide an improved electrical filter circuit.

Figure 1:
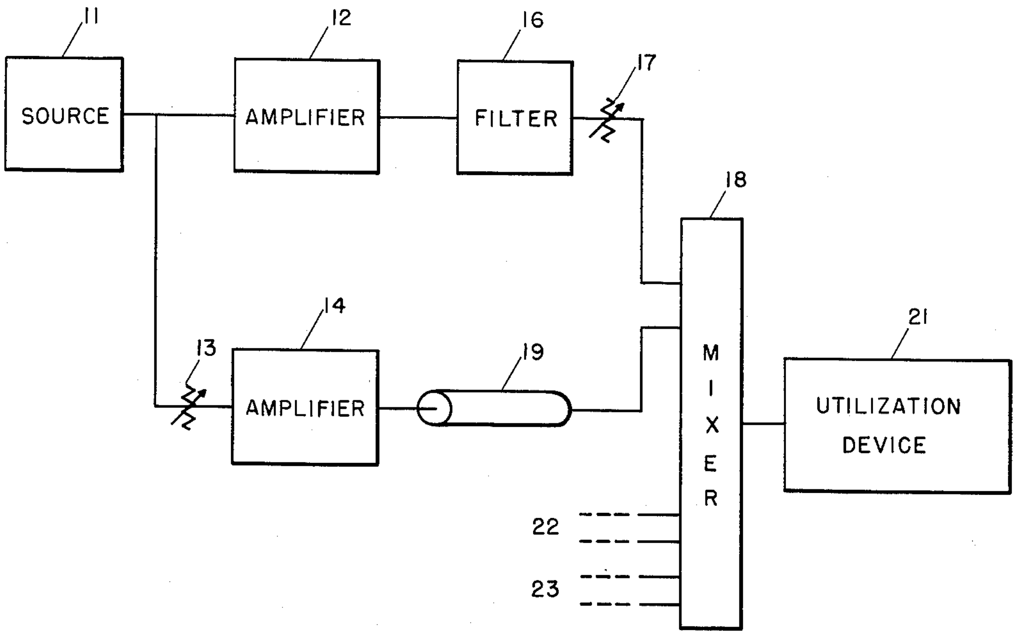

Other objects are to provide a filter circuit which inherently will maintain a complementary frequency response characteristic about a cross-over frequency and to provide an improved mixed-highs filter. Other objects will be apparent after studying the following specifications and drawings in which:

Figure 1 shows a block diagram of the filter circuit for a single channel.

Figure 2:
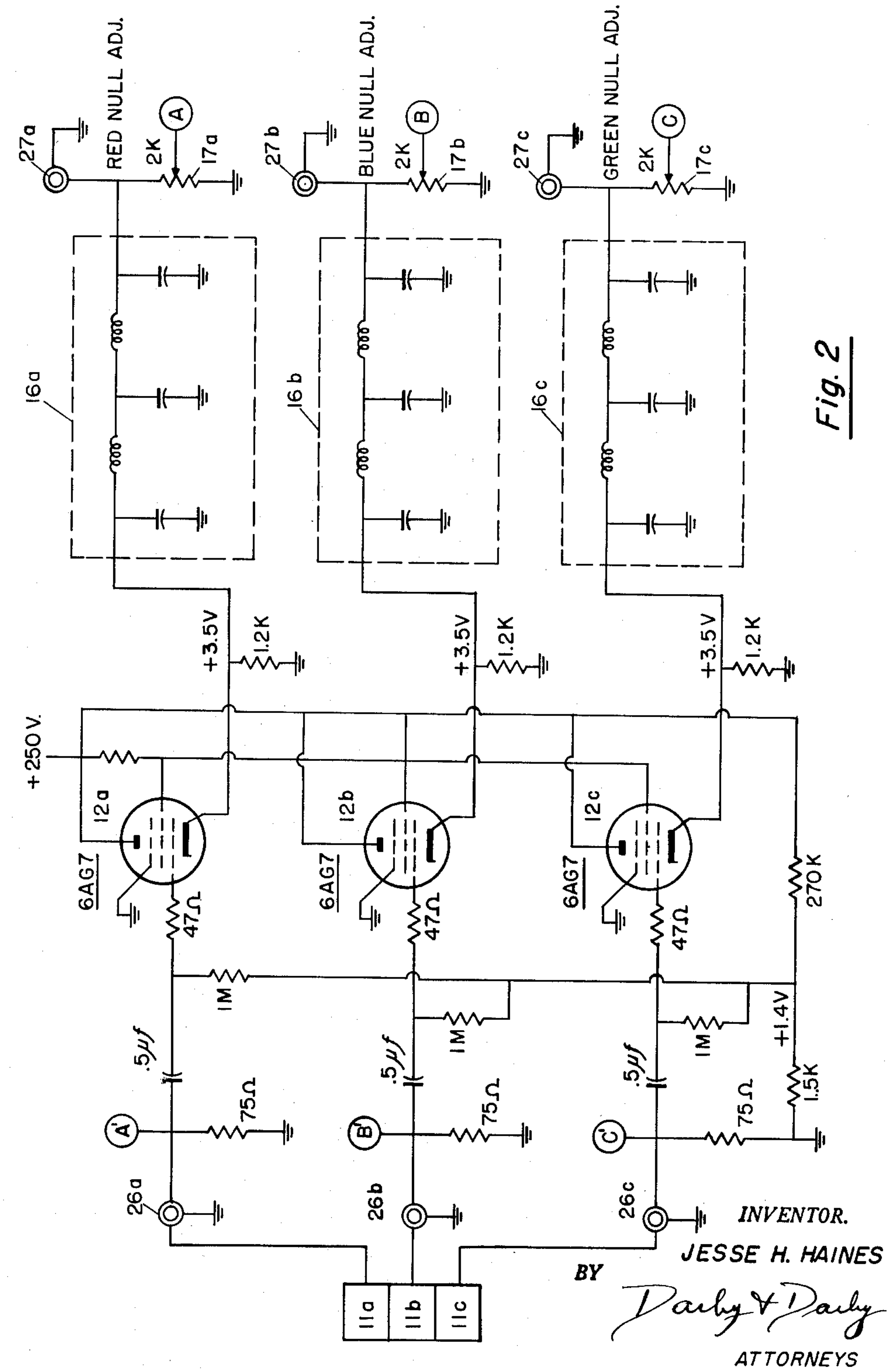
Figure 3:
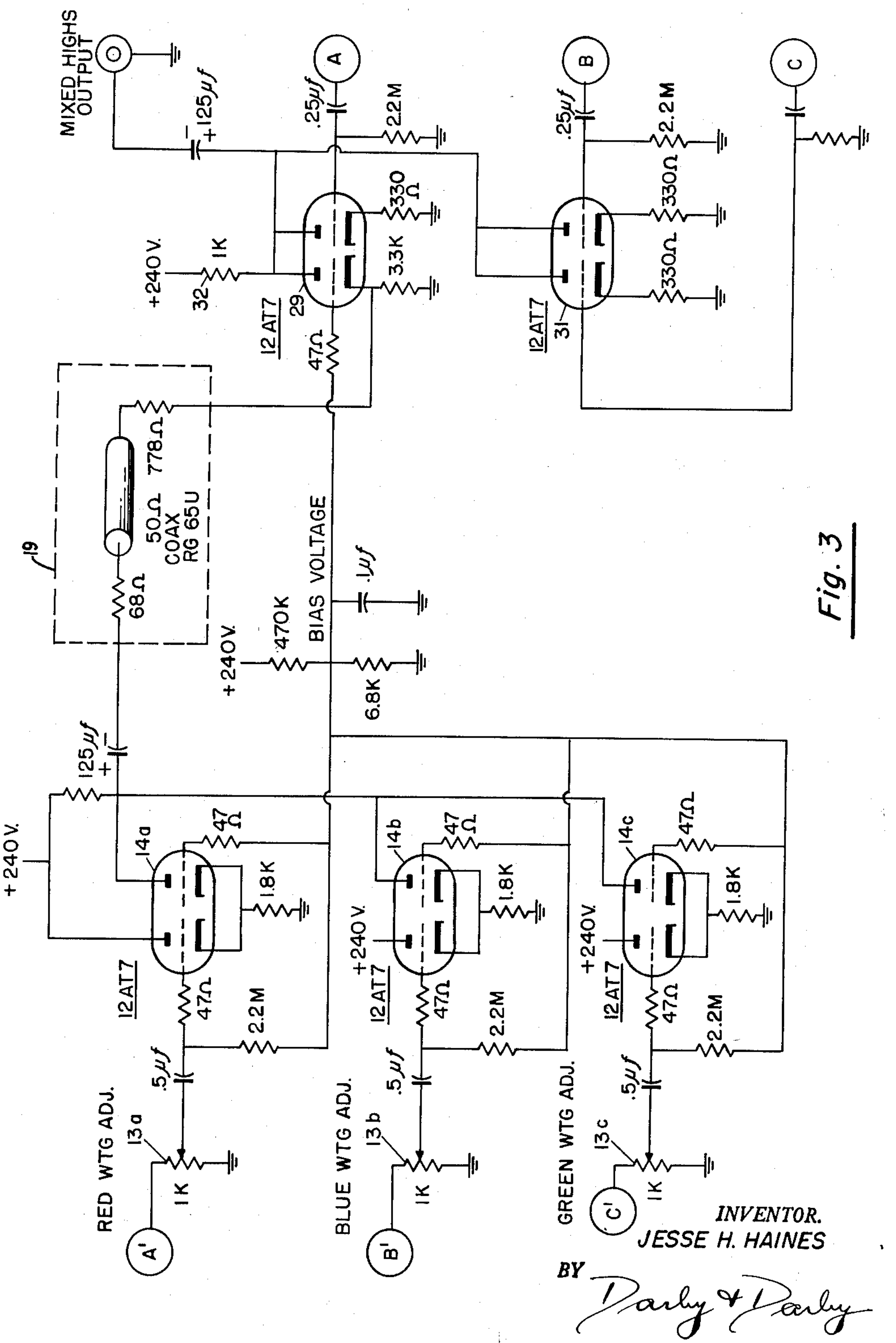

Figures 2 and 3 together show a circuit diagram of complete color or three channel apparatus.

In accordance with this invention a complete monochrome signal, having all of the frequency components, is passed through a single filter, with the result that certain of these frequency components, for instance, the high frequency components will be eliminated by the filter and the output signal thereof will contain only the low frequency components. This output signal is then mixed with a replica of the original signal in such a polarity relationship as to cancel that portion of the replica signal corresponding to the band passed by the filter. The result is that the signal obtained from the mixer will be the complement of the signal at the output of the filter and these two signals will have, inherently, a complementary frequency characteristic about the cross-over frequency. This filtering action may be applied to each of the three primary signals corresponding to the red, blue, and green components and the high frequency portions derived thereby. These high frequency portions may then be mixed together to provide the so-called mixed-highs signal.

In Figure 1 a source 11 provides a complete television signal corresponding, for instance, to the signal which transmits the green picture components of a color television system. The source 11 has two outputs, one of which is connected to the amplifier 12 and the other by means of a gain control 13 to an amplifier 14. The amplifier 12 is connected through a filter 16 and a gain control 17 to a mixer circuit 18, while the amplifier 14 may be connected to the mixer 18 by means of a delay network 19, although this network may be eliminated as will be described later. The output of the mixer 18 is connected to a utilization device 21 such as, for instance, a sampler, transmitter, or monitor, etc.

In the operation of the circuit of Figure 1, a complete monochrome television signal, having frequency components throughout the normal zero to 4 mc. band, is supplied by source 11 to the amplifier 12 and filtered by filter 16. The filter 16 may either be separate, as shown, or a part of the frequency compensating network of the amplifier 12 and may either precede or follow this amplifier. The gain control 17, which is shown following the filter 16 and which completes the first series circuit between source 11 and mixer 18, may also precede or follow either the amplifier 12 or the filter 16.

The other output of the source 11 is connected to another series circuit, which is similar to the first series circuit in that the connection of the components may be permuted in any sequence in series. These components comprise a gain control 13, which is here shown at the input end of the series circuit, an amplifier 14 connected thereto, and a delay network 19 at the output of this series circuit.

The purpose of the delay network 19 is to cause the transit time of the signal through the second series circuit to be equal, exactly, to the transit time of the signal through the first series circuit. Since, as is well known, filters delay the passage of signals therethrough in the same way as delay lines and since compensated amplifiers, such as might be used for amplifier 12, act like filters and hence, like delay lines, the transit time of the signal through the first series circuit might be appreciable. The amplifier 14 could be a compensated amplifier and, therefore, could provide some delay of the signal through the second series circuit, but probably it would be necessary to insert the delay line 19 to compensate for the remainder of the delay corresponding to the filter 16.

At the output of the first series circuit, as has been stated, there is a reduced bandwidth signal corresponding to a portion, such as the low frequency portion, of the complete signal from the source 11, while at the output of the second series circuit is a signal which corresponds in every way to the input signal except that it has been delayed and amplified the requisite amount. In order to provide the two desired signals the polarity of the signal in one of the two series circuits must be inverted with respect to the polarity in the other series circuit. This may be done by making the amplifier 12 a two stage amplifier and making the amplifier 14 a single stage amplifier or by any other means known in the art.

The two signals from the series circuit are mixed in the linear mixing circuit 18, and, as a result of the polarity relationship, the reduced bandwidth signal from the first series circuit will cancel the same portion of the signal from the second series circuit leaving, according to the example stated, only the high frequency components of the replica of the original signal. "Replica" is here used to indicate that the output signal of the second series circuit is identical in wave form but not necessarily in time or amplitude with the original signal from the source 11. The output signal from the mixer 18 comprising the high frequency components of the replica signal are transmitted to the utilization devices 21 for broadcasting purposes, studio reproduction or other desired purposes.

Two additional pairs of input circuits 22 and 23 for the mixer 18 may be connected to circuits identical with the first and second series circuit described above and used for the transmission of the two remaining primary signals, that is the red and blue signals. Since the mixer 18 is assumed to be linear, the cancellation, by the reduced bandwidth signal of each primary, of one section of the complete signal of each primary will be entirely independent of the existence of the other signals in the mixer 18. As a result, if all three primaries are introduced to the three sets of input terminals to the mixer 18 and in each case the low frequency components of the primaries are cancelled, the output signal connected to the utilization device 21 will be the mixed-highs signal.

A complete circuit for producing the mixed-highs signal is shown in Figures 2 and 3 in which similar indices are used to indicate sections of the circuit which appear in Figure 1, with the addition of the letters *a*, *b*, and *c* to denote those components devoted to the red, blue and green signal channels respectively. For simplicity, the subscripts *a*, *b*, and *c* will not be referred to in discussing Figures 2 and 3 except in such cases as are required to show a different arrangement for one channel than is provided in the other two. Figure 2 corresponds to the first series circuit of Figure 1 for each of the three primary signals, and Figure 3 corresponds to the second series circuit. The complete diagram provided by Figures 2 and 3 is similar to the circuit of Figure 1 with the addition of the necessary components to complete the input circuits to connections 22 and 23 except for a simplification which allows the use of only a single delay line instead of requiring three separate delay lines.

In Figure 2, the three sources 11 which may be, for instance, live-action cameras, movie projectors or flying spot scanners, are connected to the inputs 26 of the amplifiers 12. These amplifiers are cathode followers so that the signals are not inverted in passing therethrough, and their outputs are connected to the low pass filters 16. No component values have been given for the filters 16 since it is a routine matter to calculate them to provide whatever pass band may be desired, which, in general, will be from 0 up to one-half or two megacycles. It should be noted that the filters 16 will, in general, have a particular delaying effect for a given set of component values and that when these component values are changed in order to provide different output impedances or different cutoff characteristics, the delay time will change and it will be necessary to provide some means for varying the delay of the network 19 (for instance, Figure 3) to match the delay times of the filters 16. Such means are well known in the art. The output terminals of the filters 16 are connected to the null adjustment attenuators 17.

The weighting adjustment attenuators 13 in Figure 3 are connected to the input terminals 26 in Figure 2 as indicated by the corresponding letters. It is well known in the television industry that it is not generally desirable to have the same amplitude for the red and blue signals as for the green signal. It is possible, of course, to eliminate the weighting adjustment attenuators 13 by supplying signals having exactly the right amplitude, but these adjustments have been found to be desirable.

The amplifiers 14 comprise dual triode tubes in which the first section is connected as a cathode follower amplifier and the second section is cathode coupled to the first section. The signal is not inverted in either of these sections. A mixer is provided, in the circuit of Figure 3, by the common plate load for the second sections of the amplifiers 14. By means of this mixing arrangement, all three of the signals are combined so that they may be passed through a single delay line 19, thus eliminating the necessity of providing three separate delay lines. This combined signal comprises the full bandwidth signal for each of the primary colors and is cathode coupled to one section of the dual triode 29 which together with a similar tube 31 forms the mixer 18 of Figure 1.

The three signals from the attenuators 17 are connected to the two control grids of the tube 31 and to the second control grid of the tube 29. All four plates of the tubes 29 and 31 are directly connected together with a common plate load 32 to provide the desired mixing action. The inversion of the signals through one of the series circuits is accomplished here by feeding the three restricted bandwidth signals to the grids of the tubes 29 and 31. Alternatively these signals may be fed to the cathodes and the signal from the delay line 19 may be fed to the remaining control grid, since it does not matter which of the signals is inverted.

Although this invention has been described in limited form, it will be obvious to those skilled in the art that modifications may be made within the scope of the following claims.

What is claimed is:

1. A mixed highs filter circuit comprising a first source of television signal voltage; a low pass filter connected thereto; a second source of television signal voltage; a second low pass filter connected thereto; a mixer circuit comprising a plurality of input circuits, one of said input circuits being connected to said first filter, and a second one of said input circuits being connected to said second filter; a second mixer circuit comprising a plurality of input circuits and an output circuit, one of said last-named input circuits being connected to said first source, and a second one of said input circuits being connected to said second source; a single delay network connecting the output circuit of said second mixer circuit to a third of said input circuits of said first mixer circuit to equalize the delay encountered by signal voltages passing through each said filter, said third input circuit being subtractively related to said first and second input circuits of said first mixer circuit.

2. A mixed highs signal generator comprising a plurality of signal sources each providing output signals within a predetermined relatively broad frequency band; a first mixer circuit having a plurality of input circuits, one of said input circuits being connected to each of said sources respectively; a plurality of low pass filter circuits, one of said filter circuits being connected to each of said sources respectively to be energized thereby, the output signal of each of said filter circuits occupying a relatively narrow frequency band; a second mixer circuit having a plurality of input circuits corresponding in number at least to the number of said sources and having at least one additional input circuit; a connection between an output circuit of each of said filter circuits and one of said last-named input circuits respectively; and a delay line connecting the output circuit of said first mixer circuit to said additional input circuit, said delay line serving to delay signals passing therethrough to substantially the same extent as signals passing through said filters, said additional input circuit being subtractively related to the other input circuits of said second mixer circuit to subtract the relatively narrow band of signals from the signals passing through said delay line.

References Cited in the file of this patent

UNITED STATES PATENTS

| | | |
|---|---|---|
| 1,759,952 | McCurdy | May 27, 1930 |
| 1,902,031 | Holden | Mar. 21, 1933 |
| 1,956,121 | Craig | Apr. 24, 1934 |
| 2,627,549 | Kell | Feb. 3, 1953 |
| 2,634,324 | Bedford | Apr. 7, 1953 |
| 2,635,140 | Dome | Apr. 14, 1953 |
| 2,651,673 | Fredendall | Sept. 8, 1953 |